US010242784B2

(12) United States Patent
Yun

(10) Patent No.: US 10,242,784 B2
(45) Date of Patent: Mar. 26, 2019

(54) COIL ASSEMBLY

(71) Applicant: MANDO CORPORATION, Gyeonggi-do (KR)

(72) Inventor: Sang-Won Yun, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/006,070

(22) Filed: Jan. 25, 2016

(65) Prior Publication Data

US 2016/0217912 A1 Jul. 28, 2016

(30) Foreign Application Priority Data

Jan. 26, 2015 (KR) ........................ 10-2015-0011860

(51) Int. Cl.
*H01F 7/126* (2006.01)
*B60T 8/36* (2006.01)

(52) U.S. Cl.
CPC .................................... *H01F 7/126* (2013.01)

(58) Field of Classification Search
CPC ........... H01F 7/126; B60T 8/36; B60T 8/3675
USPC ........................................................ 303/119.3
See application file for complete search history.

(56) References Cited

U.S. PATENT DOCUMENTS 1,956,334 A * 4/1934 Parker ..................... H01F 38/12 200/40
5,449,227 A * 9/1995 Steinberg .............. B60T 8/3675 251/129.15
5,588,202 A * 12/1996 Ehlers .................. G01D 11/245 174/541
5,766,026 A * 6/1998 Cooper ............... B60R 16/0239 361/736
6,000,679 A * 12/1999 Reuter .................. B60T 8/3675 137/884
6,120,114 A 9/2000 Blazic et al.

(Continued)

FOREIGN PATENT DOCUMENTS

CN 101578144 11/2009
CN 103158688 6/2013

(Continued)

OTHER PUBLICATIONS

Office Action dated Dec. 20, 2017 for Chinese Patent Application No. 201610051261.5 and its English translation by Global Dossier.

(Continued)

*Primary Examiner* — Mang Tin Bik Lian
*Assistant Examiner* — Malcolm Barnes
(74) *Attorney, Agent, or Firm* — Ladas & Parry, LLP

(57) ABSTRACT

Disclosed herein is a coil assembly. According to an aspect of the present invention, in a coil assembly which is coupled to a printed circuit board and applies electric power to a solenoid valve installed in a hydraulic control block, a coil assembly is provided including a bobbin having a through hole in the center so that a portion of the solenoid valve is inserted therein and having a coil wound around the outer circumference thereof, a coil case installed to wrap an outer side of the bobbin, a lead wire electrically coupling the printed circuit board and the coil assembly, a support pin integrally provided with the coil case to electrically couple the coil case and the printed circuit board.

7 Claims, 6 Drawing Sheets

(56) References Cited

U.S. PATENT DOCUMENTS

| | | | | | |
|---|---|---|---|---|---|
| 6,124,775 | A * | 9/2000 | Linkner, Jr. | B60T 8/363 | 251/129.15 |
| 6,412,754 | B1 * | 7/2002 | Ogino | B60T 8/3675 | 303/119.3 |
| 2004/0070302 | A1 * | 4/2004 | Parker | B60T 8/363 | 310/194 |
| 2006/0054220 | A1 * | 3/2006 | Hatanaka | B60T 8/3675 | 137/557 |
| 2008/0017174 | A1 * | 1/2008 | Kafer | B60T 8/3675 | 123/479 |
| 2008/0257009 | A1 * | 10/2008 | Mehta | B21K 1/24 | 72/377 |
| 2014/0022717 | A1 * | 1/2014 | Bolik | G01D 11/24 | 361/679.01 |
| 2014/0285987 | A1 * | 9/2014 | Nagashima | H05K 7/12 | 361/759 |
| 2017/0243685 | A1 * | 8/2017 | Mehta | H01F 7/126 | |

FOREIGN PATENT DOCUMENTS

| | | | | |
|---|---|---|---|---|
| CN | 103158688 A * | 6/2013 | F16K 13/046 |
| KR | 10-2011-0135138 | 11/2011 | |

OTHER PUBLICATIONS

Office Action dated Nov. 5, 2018 for Chinese Patent Application No. 201610051261.5 and its English translation by Global Dossier.

* cited by examiner

【Fig. 1】
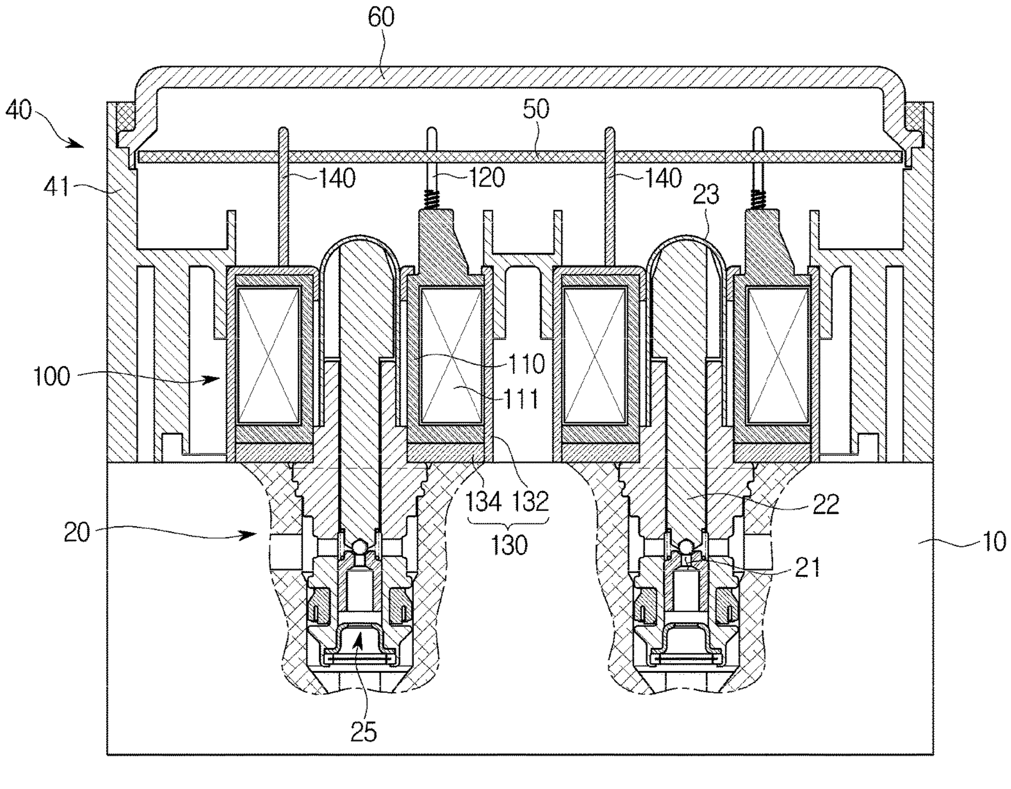

【Fig. 2】
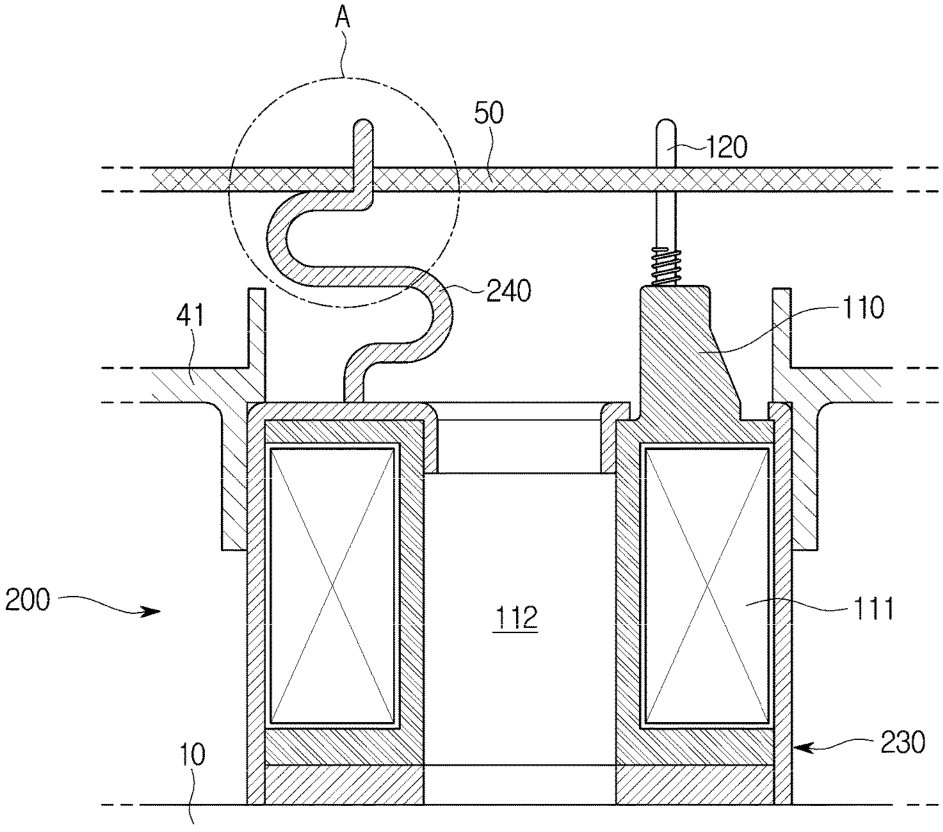

【Fig. 3】
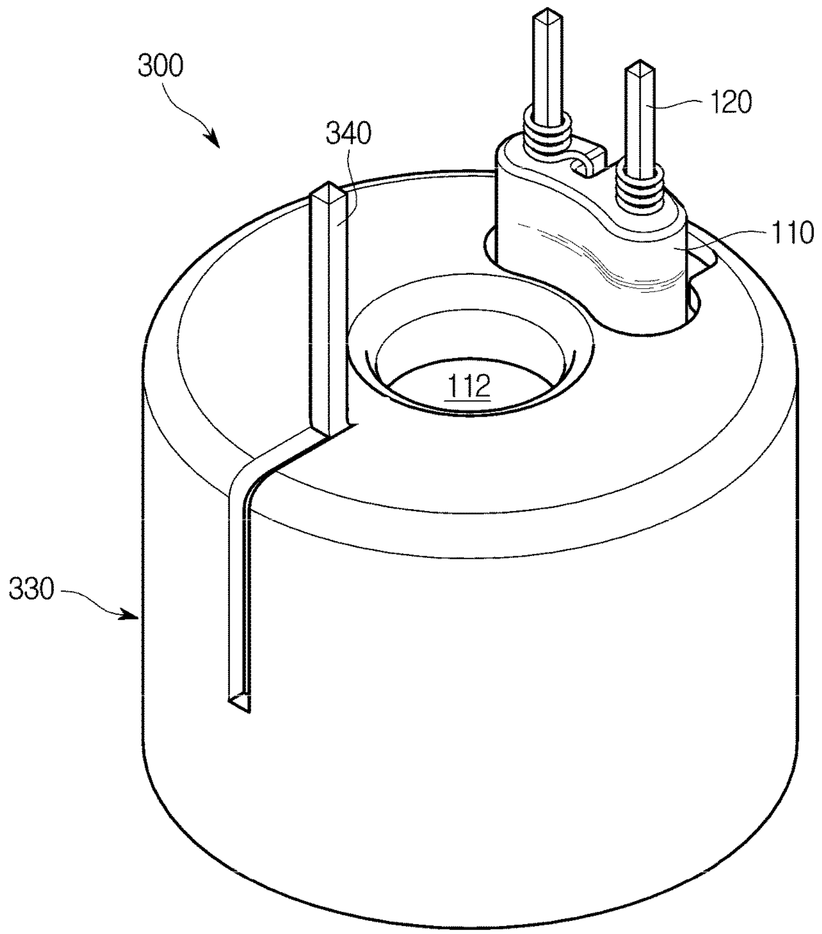

【Fig. 4】
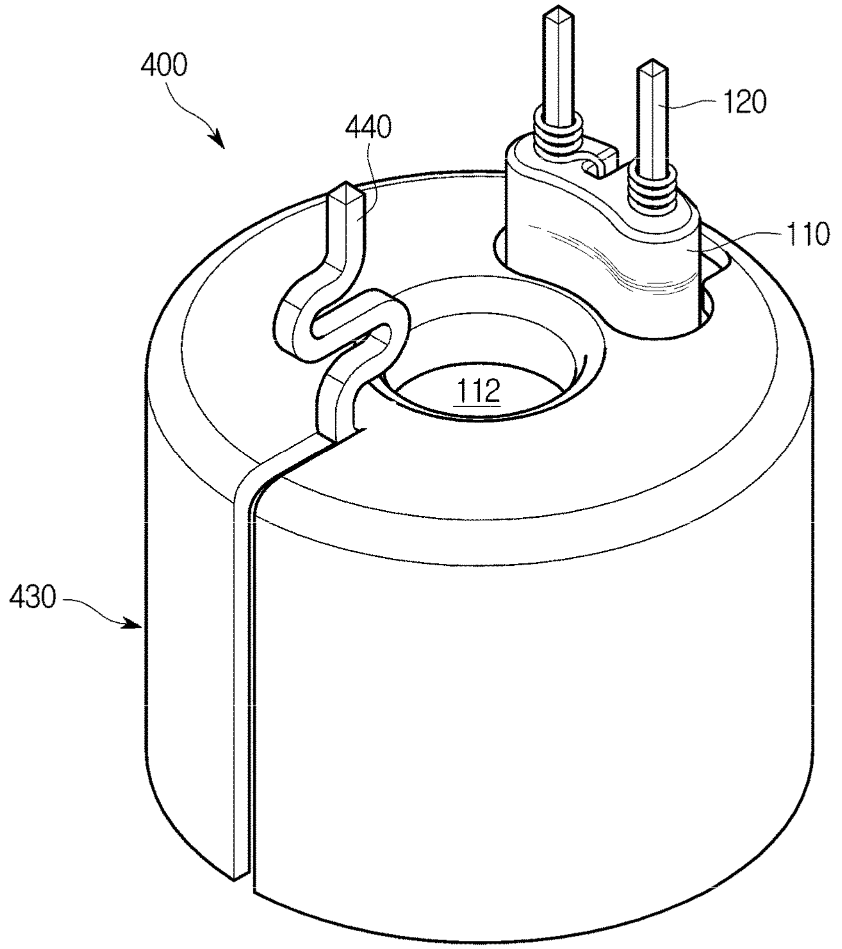

【Fig. 5】
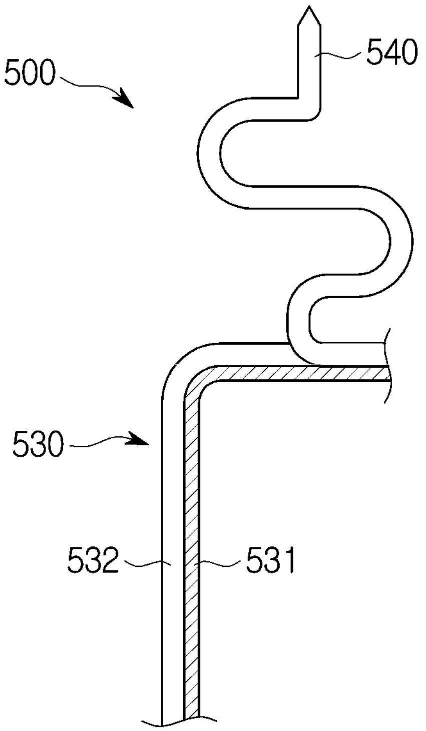

【Fig. 6】
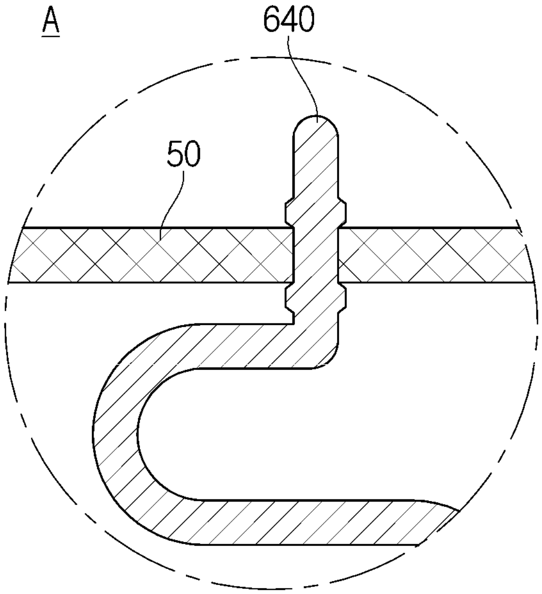

COIL ASSEMBLY

CROSS-REFERENCE TO RELATED APPLICATION

This application claims the priority to Korean Patent Application No. 10-2015-0011860, filed on Jan. 26, 2015 in the Korean Intellectual Property Office, the disclosure of which is incorporated herein by reference in its entirety.

BACKGROUND

1. Field

Embodiments of the present invention relate to a coil assembly, and more particularly to a coil assembly capable of maintaining a stable contact state with a printed circuit board and improving performance thereof by preventing electromagnetic waves.

2. Description of the Related Art

Generally, various kinds of brake systems are offered in vehicles to obtain a braking force. For example, anti-lock brake system (ABS) which prevents vehicle from skidding, electro-hydraulic braking (EHB) system, electronic stability control (ESC) system, and the like are offered and used.

Such an electronically controlled brake system is provided with a plurality of solenoid valves for controlling a brake fluid pressure transmitted to wheel brakes, a low pressure accumulator for storing oil temporarily, a pump for forced pumping the oil stored in the low pressure accumulator, a hydraulic control unit (HCU) equipped with a high pressure accumulator or the like for reducing pressure pulsation of the oil being pumped by pump, and an electronic control unit (ECU) for controlling electrically operated constituent elements.

The electronic control unit equipped with a printed circuit board (PCB) and coupled to the hydraulic control unit through a fastening member such as a bolt or the like controls constituent elements operated electrically. In addition, the solenoid valve includes a coil assembly which forms an electromagnetic field when a coil is wound and electric power is applied, and a valve assembly which opens and closes an inside flow channel by the electromagnetic field formed by the coil assembly. Here, in the coil assembly, for driving the valve assembly, lead wires of both poles formed in the coil assembly are coupled to the printed circuit board using soldering to make electrical contacts, a portion of the valve assembly is inserted into the center of the coil assembly, and the other portion is press-fitted into the hydraulic control unit made of an aluminum material.

In the meantime, in the case of electronic control unit which drives an actuator such as a motor, a solenoid coil, and the like, generally a control is achieved using a control method of pulse width modulation (PWM) drive in which a current flowing through a coil can be controlled by controlling a duty-ratio of the pulse width modulation. However, since both coils in a motor and a solenoid valve are inductive actuator, an electro-magnetic compatibility (EMC) noise is generated due to the pulse width modulation drive.

Here, for a smooth operation of the solenoid valve controlled electrically, a structure for shielding the electromagnetic waves between the electronic control unit and the hydraulic control unit is disclosed. For example, electromagnetic waves may be shielded by equipping a grounding spring between the printed circuit board and a counterpart metal component to make a contact therebetween or by making a contact between the solenoid valve and the printed circuit board through a separate coupling member.

However, for shielding such electromagnetic waves, since separate members have to be provided for making a contact structure between the printed circuit board and a body of the motor or between the printed circuit board and the hydraulic control unit, there are problems of cost increase and manufacturing difficulties in the brake system.

In addition, in the case of the lead wires coupled to the printed circuit board for operation of the solenoid valve through a soldering work, when a crack develops in the coupled portion due to using a coil heavier than a specific weight or due to an external vibration, a problem occurs where in a severe case the solenoid valve operation stops.

SUMMARY

Therefore, it is an aspect of the present invention to provide a coil assembly which enables a smooth operation of a valve by improving the assembly structure being coupled to a printed circuit board, hence shielding electromagnetic waves and preventing damages due to a vibration.

In accordance with one aspect of the present invention, in a coil assembly which is coupled to a printed circuit board and applying electric power to a solenoid valve that is installed in a hydraulic control unit, the coil assembly may be provided including a bobbin which is formed in a cylindrical shape, having a through hole in the center so that a portion of the solenoid valve is inserted therein and having a coil wound around the outer circumference thereof, a coil case installed to wrap an outer side of the bobbin, a pair of lead wire electrically coupling the printed circuit board and the coil assembly together, a support pin installed at the printed circuit board and provided on the coil case to electrically couple the coil case and the printed circuit board In addition, a portion of the coil case may be cut away, which may be bent to form the support pin.

In addition, the support pin may be bent several times to absorb a vibration in a vertical direction.

Further, the support pin may be formed at a position facing a pair of the lead wire.

BRIEF DESCRIPTION OF THE DRAWINGS

These and/or other aspects of the invention will become apparent and more readily appreciated from the following description of the embodiments, taken in conjunction with the accompanying drawings. Since these drawings illustrate preferred embodiments of the present invention, inventive concepts of the present invention should not be interpreted as limited merely to the drawings.

FIG. 1 is a cross-sectional view illustrating the assembly structure of a coil assembly and an electronic control unit in a solenoid valve for an electronically controlled brake system according to a first embodiment of the present invention;

FIG. 2 is a cross-sectional view illustrating a coil assembly according to a second embodiment of the present invention;

FIG. 3 is a perspective view illustrating a coil assembly according to a third embodiment of the present invention;

FIG. 4 is a perspective view illustrating a coil assembly according to a fourth embodiment of the present invention;

FIG. 5 is a perspective view illustrating a coil assembly according to a fifth embodiment of the present invention; and FIG. 6 is an enlarged view illustrating another embodiment of region A of FIG. 2.

DETAILED DESCRIPTION

References will now be made to the embodiments of the present invention for a detailed explanation, examples of which are illustrated in the accompanying drawings, wherein like reference numerals refer to like elements throughout.

These embodiments below are provided so as to fully convey the concepts of the present invention to those skilled in the art. The present invention may be embodied in a different form, and should not be construed as being limited to the embodiments set forth herein. In the drawings, for the sake of clarity of the present invention, an illustration may have omitted portions unrelated to the explanation, and sizes may be somewhat exaggerated for a better understanding.

FIG. 1 is a cross-sectional view illustrating an assembly structure of a coil assembly and an electronic control unit in a solenoid valve for an electronically controlled brake system according to a first embodiment of the present invention.

Referring to FIG. 1, an electronically controlled brake system may be provided with a hydraulic control unit 10 in which a plurality of solenoid valves 20 for controlling a brake fluid pressure transmitted to wheel brakes (not shown) are installed by press-fitting and an electronic control unit 40 coupled to the hydraulic control unit 10. Here, in addition to the solenoid valve 20, a low pressure accumulator (not shown) for storing oil temporarily, a pump (not shown) for forced pumping of the oil stored in the low pressure accumulator, a motor (not shown) for driving the pump, a high pressure accumulator (not shown) for reducing pressure pulsation of the oil being pumped at the pump, and the like may be equipped in the hydraulic control unit 10, and electronic components provided in the hydraulic control unit 10 may be controlled by the electronic control unit 40, thereby performing a braking operation.

For example, the solenoid valve 20 installed in the hydraulic control unit 10 may include a valve assembly 25 having a sleeve 23 in which an armature 22 moving back and forth is installed in order to open and close an orifice 21 and a coil assembly 100 through which the sleeve 23 is coupled by a sufficient margin for operating the armature 22 by an electromagnetic force which is formed when electric power is applied. A lower portion of the valve assembly 25 may be coupled and press-fitted into the hydraulic control unit 10, and the coil assembly 100 may be installed in a housing 41 of the electronic control unit 40 together with an upper portion of the valve assembly 25.

The coil assembly 100 according to an aspect of the present invention may include a bobbin 110 having a cylindrical shape, to which a coil 111 is wound multiple times, a coil case 130 which is coupled to wrap around the bobbin 110, and a pair of lead wire 120 fixedly inserted on the bobbin 110. That is, the coil assembly 100 may have a cylindrical shape, and a through hole 112 may be formed in the center thereof, so that the upper portion of the valve assembly 25 is inserted. Here, the coil case 130 which is coupled to wrap the outer side of the bobbin 110 may be provided with an upper case 132 which has a cylindrical shape with an open lower portion, and a lower case 134 which covers the open portion of the upper case 132 in the state that the bobbin 110 is accommodated and coupled to the upper case 132. A through hole 112 may be formed in each of the upper-center portion of the upper case 132 and the center portion of the lower case 134 such that the sleeve 23 of the valve assembly 25 is inserted therethrough. One side of the lead wire 120 coupled to an end portion of the coil 111 may perform a role of guiding a power supply, and the other side may be coupled to be connected with a printed circuit board 50 which will be described later.

In the meantime, according to the first embodiment of the present invention, the coil assembly 100 may further include a support pin 140 which is provided to be electrically coupled to a printed circuit board 50. The structure of the support pin 140 will be described again in the explanation below.

The electronic control unit 40, as described above, may be provided with the housing 41 which is coupled to the hydraulic control unit 10 and has an upper and a lower open portions, the printed circuit board 50 which is installed in the upper open portion of the housing 41, and a cover 60 which covers the upper open portion of the housing 41. That is, the electronic control unit 40 accommodating the upper portion of the solenoid valve 20 in the opened lower portion of the housing may be coupled to the hydraulic control unit 10 using a mounting bolt (not shown). Here, the printed circuit board 50 may be disposed and installed in the upper open portion of the housing 41 spaced a certain amount of distance from the coil assembly 100.

According to the first embodiment of the present invention, at the assembly structure of the coil assembly 100 and the electronic control unit 40 in a solenoid valve for an electronically controlled brake system as described above, a support pin 140 which electrically couples the coil assembly 100 and the printed circuit board 50 together may be provided. This support pin 140 is disposed at the upper-end portion of the coil case 130 and coupled to the printed circuit board 50.

More particularly, the support pin 140 may be provided on the upper side of the coil case 130, that is, on the upper side of the upper case 132. This support pin 140 may be formed at a position facing a pair of the lead wire 120 in the diameter direction of the upper case 132. This is for coupling the coil case 130 to the printed circuit board 50 in a way that is more stable.

In the meantime, the shape of the support pin 140 which electrically couples the coil case 130 to the printed circuit board 50 may be modified so as to more smoothly absorb a shock due to an external vibration. For example, as shown in FIG. 2, a support pin 240 may be formed bent several times to absorb a vibration in a vertical direction. That is, a stable coupling between a coil case 230 and the printed circuit board 50 may be maintained as the support pin 240 is bent several times to form a spring shape so as to absorb an external shock or vibration. Here, like reference numerals described in FIG. 2 and in previous drawing designate a member for the same function.

According to the embodiments of the present invention, the support pins 140 and 240 as described above are shown and illustrated such that they are separately provided to electrically couple the coil cases 130 and 230 to the printed circuit board 50, however it is not limited thereto, and a support pin may constitute a coil case as a part thereof. For example, a coil assembly 300 according to a third embodiment of the present invention is illustrated in FIG. 3. Here, like reference numerals described in previous drawings designate a member for the same function.

Referring to FIG. 3, the coil assembly 300 is different from the first embodiment in that it has a structure where a part of a coil case 330 is cut away and a support pin 340 is formed through the cut-away part. That is, in the coil case 330 of the coil assembly 300 according to the present embodiment, the support pin 340 may constitute the coil case 330 as a part thereof. Such a support pin 340 may be formed by cutting away a part of the coil case 330 and bending the part that is cut away.

Further, as shown in FIG. 4, a part of a coil case 430 may be constituted by a support pin 440 provided to a coil assembly 400 according to a fourth embodiment of the present invention, and the support pin 440 may be bent several times to form a spring shape.

Consequently, the support pins 140, 240, 340, and 440 for each embodiment as described above may be provided at a position facing the lead wire 120 and may electrically couple the coil cases 130, 230, 330, and 430 to the printed circuit board 50, which allows preventing a damage at the coupling portion between the lead wire 120 and the printed circuit board 50 by absorbing an external vibration as well as serving a role of shielding electromagnetic waves, thereby enabling the brake system to perform a stable braking operation. In addition, since a part of the coil case 330 and 430 constitutes the support pin 340 and 440, cost may be reduced.

Meanwhile, referring to FIG. 3 and FIG. 4, FIG. 3 illustrates a view in which only a part of the coil case 330 in a vertical direction is cut away to form the support pin 340 and a lower end portion of the coil case 330 maintains a cylindrical shape, and FIG. 4 illustrates a view in which a cut-away portion extends to a lower-end corner of the coil assembly 330 to form the support pin 440. As described above, forming support pins 340 and 440 in a various way may be possible by changing a cut-away length of the coil cases 330 and 430.

Referring to FIG. 5, in a coil assembly 500 according to a fifth embodiment of the present invention, a support pin 540 may be formed by cutting away only a part of an outer shell of a coil case 530. In the outer shell of the coil case 530, an outer side 532 may be cut away and transformed to form the support pin 540 while an inner side 531 maintains a cylindrical shape.

As described above, an electromagnetic field formed by the coil 111 provided inside the coil case 530 may be effectively shielded by maintaining the inner side 531 of the outer shell of the coil case 530 in a cylindrical shape.

FIG. 6 is an enlarged view illustrating another embodiment of region A of FIG. 2.

Referring FIG. 2, soldering may be used to electrically couple the support pin 240 to the printed circuit board 50. Through the soldering, the support pin 240 may be fixed and electrically coupled to the printed circuit board 50.

Meanwhile, referring to FIG. 6, a pressfit may be used to electrically couple a support pin 640 to the printed circuit board 50. Through the pressfit, the support pin 640 may be fixed and electrically coupled to the printed circuit board 50. The pressfit may be elastically deformed when the support pin 640 is inserted into a hole of the printed circuit board 50. That is, after being inserted into the hole of the printed circuit board 50, detachment of the support pin 640 may be prevented due to a deformed shape.

The coil assembly according to an embodiment of the present invention in which a support pin capable of electrically coupling the printed circuit board to the coil case is provided can shield electromagnetic waves and have a cost saving effect by having a part of the coil case constituted by the support pin.

In addition, bending the support pin several times to form a spring shape allows absorbing a shock due to an external vibration, which makes it possible to prevent a damage at the coupling portion between the lead wire and the printed circuit board, thereby providing a stable braking operation of the brake system.

As above, while this invention has been described in connection with limited embodiments and drawings, it is to be understood that the invention is not limited to the embodiments described as above, and those skilled in the art will readily appreciate that various modifications are possible in embodiments within the aspects of inventive concept and equivalent scope of the claims to be described as below.

What is claimed is:

1. A coil assembly which is coupled to an electronic control unit in which a printed circuit board is installed and applies electric power to a solenoid valve installed in a hydraulic control unit, comprising:

a bobbin having a through hole in the center so that a portion of the solenoid valve is inserted therein and having a coil wound around an outer circumference thereof;

a coil case installed to wrap an outer side of the bobbin;

a lead wire configured to electrically couple the printed circuit board and the coil assembly together; and a support pin which is a part of the coil case having a shape bent toward the printed board, has the same material as the coil case, is coupled to the printed circuit board and electrically couples the coil case and the printed circuit board, wherein an outer part of the coil case has a groove where the support pin is cut from the coil case.

2. The coil assembly of claim 1, wherein the support pin is formed at a position facing the lead wire.

3. The coil assembly of claim 1, wherein the support pin is bent several times in a height direction between a side of the coil case and the printed circuit board.

4. The coil assembly of claim 1, wherein the support pin is bent several times to absorb a vibration in a vertical direction.

5. The coil assembly of claim 1, wherein the support pin is oppositely disposed with the lead wire with respect to the solenoid valve.

6. The coil assembly of claim 1, wherein soldering electrically couples the support pin to the printed circuit board.

7. The coil assembly of claim 1, wherein one end of the lead wire is coupled to the coil and an other end of the lead wire is coupled to the printed circuit board.

* * * * *